Aug. 28, 1951     E. J. HRDLICKA, JR     2,565,923
WIPER RING ASSEMBLY
Filed Dec. 12, 1945
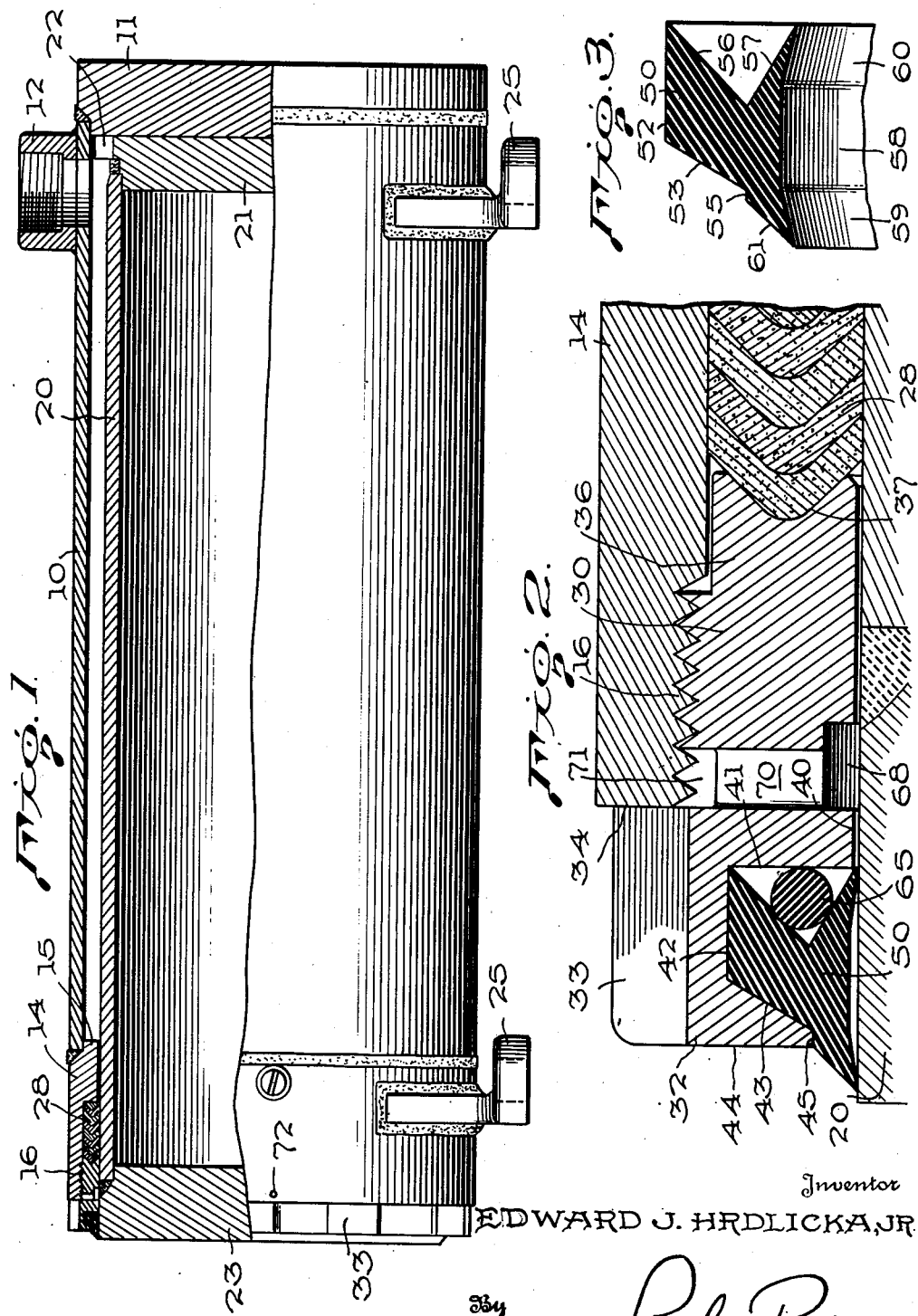
Inventor
EDWARD J. HRDLICKA, JR.
By
Leech & Radue
Attorneys Patented Aug. 28, 1951

2,565,923

UNITED STATES PATENT OFFICE 2,565,923

WIPER RING ASSEMBLY

Edward J. Hrdlicka, Jr., Painesville Ohio, assignor to Hydraulic Equipment Company, Cleveland, Ohio, a corporation of Ohio Application December 12, 1945, Serial No. 634,594

6 Claims. (Cl. 286—17)

This invention relates to wiper ring assemblies and more particularly to devices for maintaining clean the surfaces of piston rods, ram plungers and the like, serving the dual purposes of maintaining at a minimum the undesired film of operating or lubricating fluid on the exposed plunger which tends to collect dust and grit particles from the air, and of removing any such collected particles to prevent them from being drawn into the packing and/or cylinder.

It is a general object of the present invention to provide a novel and improved wiper ring assembly.

More particularly it is an object of the invention to provide a self-compensating wiper ring assembly capable of maintaining substantially uniform pressure contact with the engaging plunger over a long period of time in spite of wear.

One of the more important objects of the invention is to provide a wiper ring having a configuration capable of cooperating with the walls of a ring housing whereby the ring may be properly positioned and stressed over a long period of time by means of a swellable ring responsive to a fluid wiped from the rod surface.

A further object of the invention comprises the use with a wiper ring, of a compression element formed of material capable of combining with a fluid wiped from the rod surface to provide substantially continuous minute increases in compression of the material of the ring to compensate for its wear and maintain a nearly constant pressure on the plunger.

An important feature of the invention resides in the use of a combined packing nut or follower and wiping ring carrier.

Other and further objects and features of the invention, including the low cost, ease of assembly and replacement and the like, will be more apparent to those skilled in the art upon a consideration of the accompanying drawing and following specification, wherein is disclosed a single exemplary embodiment of the invention with the understanding that such changes and modifications may be made therein as fall within the scope of the appended claims without departing from the spirit of the invention.

In said drawing:

Fig. 1 is a side elevation, partly in radial section, of a hydraulic ram or hoist equipped with a wiper ring assembly constructed in accordance with the present invention;

Fig. 2 is a fragmentary radial section through the cylinder wall of the device of Fig. 1 shown on a greatly enlarged scale; and Fig. 3 is an enlarged transverse section through the wiper ring apart from its supporting and expanding mechanism.

When using various types of hydraulic, pneumatic, and steam operated equipment where the piston rod or ram plunger surface is exposed to particularly gritty, dusty or dirty atmospheric conditions, it is found that the life of the packing which maintains the operating fluid in place is often extremely short and in severe cases where the foreign matter is abrasive the plunger may become badly scratched or scored and sometimes prevents satisfactory operation of the mechanism after a short term of use.

In devices of the above type either the operating fluid or the lubricating medium, if they are different, forms a microscopic film on the surface of the piston rod or plunger as it is extended which serves to collect foreign matter in the atmosphere and draw the same back through the packing when the plunger is retracted. Not only does this matter subject the packing to an abrasive action which quickly wears it out but it also contaminates the operating and lubricating fluids and may affect the whole operating system. Any abrasive remaining lodged in the packing subjects the plunger to scoring.

Many machine elements which are not operated by a pressure fluid nevertheless have close fits in lubricated guides or sleeves, the bearing surfaces of which need protection against grit, dust, shavings and the like which may accumulate on the lubricated surface of a projected part and later be drawn into the bearings.

Dust boots and other types of seals have been heretofore proposed or used, but are cumbersome, expensive, short lived and often impractical. The present invention proposes a highly effective wiper which practically eliminates troubles from foreign matter, first by substantially reducing the quantity of lubricating or operating medium forming the film on the surface of the rod or plunger. This materially reduces the accumulation of foreign matter and then on the return stroke the wiper cleans off all of this matter and prevents it from entering the packing.

Referring now to the drawings and first to Fig. 1, which illustrates an embodiment of the invention as applied to an hydraulic ram or hoist, there is shown at 10 a ram cylinder in the form of a thin walled steel tube equipped with a welded-in bottom head 11 and the fluid supply spud 12.

At the upper or outer end a combined packing and head member 14 is welded to the cylinder 10 and includes an inwardly projecting stop ring portion 15 for limiting the outward movement of the plunger, which ring at its opposite or outer end forms a seat for the packing. The outer end portion of 14, which is coextensive with the cylinder wall, is internally threaded adjacent its end as at 16.

The piston or plunger assembly includes a second thin walled tube 20 having a relatively close sliding fit within 15. It is supplied with a welded-in bottom 21 having a radial flange serrated as at 22 to permit fluid, entering through 12, to get beneath the same. The operating head 23 at the opposite or outer end of the plunger is of the same external diameter as the tube 20 and is welded thereto. This plunger is assembled from the bottom end of the cylinder before welding in the bottom head 11. The projecting portions of flange 22 are adapted to engage beneath the stop ring 15 to prevent the plunger member passing out of the cylinder. Any load to be moved is actuated by the head 23, the cylinder being fastened down as by brackets 25.

In order to prevent leakage of the operating fluid suitable packing, preferably of the multiple chevron type, is fitted as at 28, resting on the outer face of the stop ring 15 and subject to compression and consequent expansion, to engage the plunger surface, by means of the follower ring or packing nut 30 which has a portion externally threaded to engage with the thread 16 in head member 14.

This follower ring is shown in great detail in Fig. 2 as including the flange or outer nut portion 32, dentated as at 33 to provide a grip for a spanner type wrench. It has a shoulder 34 which may seat against the head 14 to limit tightening of the packing. In this case the number of packing rings is adjusted to get the desired tightness. The packing follower portion of 30 includes an annular section 36 externally threaded to engage the threads 16 in the head 14 and having its inner end surface channeled or grooved as at 37 to properly cooperate with the apex of the top packing ring.

Without in any wise enlarging or changing the external shape of the packing nut it is made to accommodate the wiper ring forming the principal subject of the present invention. For this purpose it will be noted that this nut is bored as at 40 to have a loose clearance with the surface of the ram cylinder 20, and that the radial wall 41 near the shoulder 34 extends outwardly from this to meet a cylindrical wall 42 which meets at an obtuse angle an inclined outer wall 43. Instead of permitting this wall 43 to meet at a sharp edge with the top or outer surface 44 of the nut an enlarged cylindrical bore 45 joins these merging surfaces. It will be seen that there is thus formed an annular chamber to accommodate a large portion of the wiper ring 50 and that in cross-section this chamber is generally trapezoidal in form.

The wiper ring is built to fit largely within the chamber thus described and is defined by an annular outer surface 52 adapted when new to closely engage the surface 42 of the chamber. Likewise there is an upward inclined wall 53 meeting the corresponding wall 43 in the chamber. A shoulder 55 fits against the wall of the annular bore 45. The rear portion of the wiper ring, however, is not formed to fit against radial wall 41 but is provided with a relatively large deep V-groove formed by walls 56 and 57.

The inner surfaces of the ring which face the plunger include a central cylindrical portion 58 slightly spaced from the plunger, an inwardly inclined forward portion terminating in contacting edge 59 and an inwardly inclined rear portion terminating in contacting edge 60. The surface whose edge 59 closely bears on the plunger meets with the sloping outer surface 61, which is exposed beyond the packing nut, at an acute angle and the two combine to wipe off any combination of liquid and foreign matter and to roll the same up on the surface 61 and break it into sections so that it falls off whereby the ring is self-clearing. The surface whose edge 60 also engages the plunger and wipes off lubricant or operating liquid during the extension of the plunger, meets the surface 57 at a very sharp angle, insuring effective reduction of the lubricant film to extreme thinness on the outward stroke. The relieved inner surface 58 reduces friction on the plunger and contributes to the sharpness of the wiping edges 59 and 60.

Since the wiping ring is subject to wear, arrangements are made to automatically advance the engaging faces or lips toward the plunger at a rate substantially commensurate with the rate of wear. This is effected by means of an expander ring 65 fitting in the V-groove, bearing against surfaces 56 and 57 of the wiper ring and against surface 41 of the packing nut recess.

When initially applied this ring exerts but little pressure in any direction. It, however, is formed of a rubber composition of such nature that it expands due to contact with the lubricating or operating medium, which is usually oil, and this expansion, due to contact with this liquid, is controlled so as to allow for a substantially fixed growth of the ring. Thus is assured an easy initial assembly of the cylinder and plunger as well as substantially fixed pressure on the wiping edges 59 and 60 during operation. The two rings 50 and 65 are so proportioned that at assembly no appreciable pressure is exerted on the wiping edges but after a short period of operation, during which the expansion ring is subjected to the action of the oil, it distends and causes the wiping edges to maintain a firm contact with the plunger even though worn. It will be seen that radial expansion of ring 65 acts against surface 57 to hold the wiping edge 60 in engagement with the plunger and that reaction against surfaces 56, 57 and 41 move the whole wiper ring forward so that surface 53 thereof slides down ring surface 43 and maintains edge 59 in proper engagement with the plunger.

The wiper ring is formed of some resilient material such as synthetic rubber which does not react with and is unaffected by oil or operating liquid so that this ring changes shape only very slowly and solely by reason of wear.

In operation, when the ram plunger is extended, the major portion of the oil or other liquid is cleaned off by means of the packing rings 28 but a microscopic film escapes these rings and is further reduced in thickness by the wiping action of thin edge 60 of the wiper ring, so that the tendency of the plunger to collect foreign matter when extended is materially reduced. The oil, thus scraped off of the plunger collects in the circumferential groove 68 in the inner wall of the packing follower and some of it is forced into the chamber behind the wiper ring where it can react with the expansion ring 65 to produce the desired swelling. When this swelling has reached its predetermined maximum for the time interval involved the chamber 68 serves as a temporary reservoir for a small quantity of oil.

When the plunger is retracted the edge 59 will wipe off any foreign matter which may have collected or the remaining oil film and the self-cleaning operation previously referred to takes place. As the plunger in returning passes edge 60 of the wiper ring, the oil stored in recess 68 and any excess in the chamber with the expansion ring serves to lubricate the plunger, providing a film of clean lubrication free from foreign matter which permits long packing life and prevents plunger scoring.

If due to natural wear the packing begins to leak and an abnormal amount of oil collects on the plunger, the excess wiped off by wiper ring 50 is bled to the outside of the ram by means of a single radial hole 70 opening from 68 outwardly where it discharges into an undercut channel 71 which leads the liquid to a bleeder hole 72 in the wall of the head 14, as seen in Fig. 1. This hole can be eliminated if care is taken not to bring the head of the packing follower closely down against the end of the cylinder head. Where the hole is used it may be watched from time to time and the effluence of excess quantities of oil used as an indication that the ram packing is in need of replacement. This bleed arrangement also insures against blowouts of the wiping ring assembly.

While the above description has dealt specifically with a fluid operated plunger it will be clear that the wiper ring assembly is of equal value in the absence of packing needing protection. For instance, a rod or shaft sliding in a lubricated bearing, such as the tail-stock of a lathe, may be equipped with a wiper in accordance with this invention and the bearing protected against wear resulting from foreign matter collecting on the rod. Such matter is reduced to a minimum by cleaning lubricant from the extending rod and wiping the foreign matter from it during retraction.

The wiper ring assembly will be seen to be low in cost, easy to assemble or replace without the use of special tools and to have no projecting parts to interfere with ram operation or increase in ram size.

I claim:

1. In a fluid operated ram having a cylinder and sliding plunger, in combination, a packing compression nut secured to the cylinder surrounding the plunger and having an internal annular recess adjacent its outer end, a wiper ring having a generally radial flange housed in said recess and having an integral wiping band including axially spaced feather edges engaging the plunger, said radial flange having a V-groove in one of its faces partially defining one of said edges, an expander ring in said recess and groove and formed of material swelled by contact with fluid wiped from the plunger to apply pressure to at least said edge formed by said groove to compensate for wear thereon, said recess and wiper ring having co-operating inclined surfaces on the other side of said radial flange from the V-groove adapted to advance the other wiper edge toward the plunger as the expander ring swells in cross-section.

2. In an oil operated ram, in combination, a cylinder, a sliding plunger, a stuffing-box surrounding the plunger and supported by the cylinder, packing for the plunger in said stuffing box, a packing nut secured in said stuffing-box and having an internal annular chamber open toward the plunger, a wiper ring at least partially housed in said chamber, formed of oil resistant resilient material and having spaced feather edges engaging the plunger to wipe the same in both directions of motion thereof, one wall of said chamber being substantially at right angles to the axis of said plunger, said wiper ring having the surface confronting said wall formed with a circumferential V-groove, an expander ring in said groove, engaging both walls thereof and the said chamber wall, said expander ring being subject to swelling when wet by oil to slowly increase in volume and compensate for wear on the wiper ring.

3. In an oil operated ram, in combination, a cylinder, a sliding plunger, a stuffing-box surrounding the plunger and supported by the cylinder, packing for the plunger in said stuffing box, a packing nut secured in said stuffing-box and having an internal annular chamber open toward the plunger, a wiper ring at least partially housed in said chamber, formed of oil resistant resilient material and having spaced feather edges engaging the plunger to wipe the same in both directions of motion thereof, one wall of said chamber being substantially at right angles to the axis of said plunger, said wiper ring having the surface confronting said wall formed with a circumferential V-groove, an expander ring in said groove, engaging both walls thereof and the said chamber wall, said expander ring being subject to swelling when wet by oil, the opposite wall of said chamber and the corresponding engaging wall of the wiper ring being divergent from the first wall in a radially inwardly direction whereby volumetric expansion of said expander ring causes the wiper ring to advance radially inwardly toward the plunger.

4. The combination claimed in claim 3 in which the inner wall of said V-groove forms one face of the feather edge which wipes the advancing plunger whereby oil is diverted into said groove to wet said expander ring.

5. The combination claimed in claim 3 in which the inner wall of said V-groove forms one face of the feather edge which wipes the advancing plunger whereby oil is diverted into said groove to wet said expander ring, and there is provided an additional reservoir in the packing nut for such wiped oil adapted to reapply the oil to the retracting plunger to lubricate the packing.

6. For use with a rod longitudinally slidable in a bore and subjected to lubrication, in combination, an internal annular chamber in the wall of said bore open toward the rod, a wiper ring at least partially housed in said chamber, formed of resilient material resistant to the lubricant and having spaced feather edges engaging the rod to wipe the same in both directions of motion thereof, one wall of said chamber being substantially at right angles to the axis of said rod, said wiper ring having the surface confronting said wall formed with an annular V-groove, an expander ring in said groove, engaging both walls thereof and the said chamber wall, said expander ring being subjected to continuous slight swelling when wet by said lubricant, the opposite wall of said chamber and the corresponding engaging wall of said wiper ring being flared toward said rod whereby expansion of said expander ring causes the wiper ring to advance along said flared wall toward the rod.

EDWARD J. HRDLICKA, Jr.

(References on following page)

REFERENCES CITED

The following references are of record in the file of this patent:

UNITED STATES PATENTS

| Number | Name | Date |
|---|---|---|
| 1,955,157 | Wayne | Apr. 17, 1934 |
| 1,992,746 | Fortune | Feb. 26, 1935 |
| 2,316,941 | Dodge | Apr. 20, 1943 |
| 2,368,137 | Harmon | Jan. 30, 1945 |
| 2,443,332 | Summers | June 15, 1948 |

FOREIGN PATENTS

| Number | Country | Date |
|---|---|---|
| 459,417 | Germany | of 1928 |
| 502,115 | Great Britain | of 1939 |